United States Patent [19]
Tomikawa et al.

[11] Patent Number: 5,451,828
[45] Date of Patent: Sep. 19, 1995

[54] VIBRATORY GYROSCOPE

[75] Inventors: Yoshiro Tomikawa, 2-2-311 Rinsenji, Yonezawa-shi, Yamagata-ken, Japan; Kazumasa Ohnishi, Nagaoka, Japan

[73] Assignees: Alps Electric Co., Ltd., Tokyo; Yoshiro Tomikawa, Yonezawa, both of Japan

[21] Appl. No.: 278,776

[22] Filed: Jul. 22, 1994

[30] Foreign Application Priority Data

Jul. 22, 1993 [JP] Japan .................................. 5-201322
Mar. 28, 1994 [JP] Japan .................................. 6-082579

[51] Int. Cl.6 .......................................... H01L 41/08
[52] U.S. Cl. ................................. 310/370; 310/321; 310/329; 73/505; 73/517 AV
[58] Field of Search ................ 310/316, 317, 329, 321, 310/370, 25, 15; 73/505, 517 AV, 517 A, 517 R

[56] References Cited

U.S. PATENT DOCUMENTS

| | | | |
|---|---|---|---|
| 3,354,413 | 11/1967 | Ko | 310/370 |
| 4,538,461 | 9/1985 | Juptner et al. | 73/505 |
| 4,785,215 | 11/1988 | Blech | 310/329 |
| 5,020,370 | 6/1991 | Deval et al. | 73/517 AV |
| 5,049,776 | 9/1991 | Ogawa | 310/321 X |
| 5,166,571 | 11/1992 | Konno et al. | 310/333 |
| 5,331,242 | 7/1994 | Petri | 310/370 |
| 5,367,217 | 11/1994 | Norling | 310/370 |

*Primary Examiner*—Mark O. Budd
*Attorney, Agent, or Firm*—Guy W. Shoup; Patrick T. Bever

[57] ABSTRACT

A vibratory gyroscope, including a vibrator, which has three elastic arms separated by two slits, a driving means for generating vibration in at least one elastic arm, and a detecting means for detecting a component of vibration in a direction, which intersects with the direction of the vibration generated in an elastic arm due to Coriolis force when the vibrator rotates.

10 Claims, 19 Drawing Sheets

VIBRATORY GYROSCOPE

BACKGROUND OF THE INVENTION

1. Field of the Invention

The present invention relates to a vibratory gyroscope, which detects a rotatory angular velocity by making use of Coriolis force generated when a vibrator rotates while vibrating and, more particularly, to a vibratory gyroscope, which permits easy adjustment of the vibratory frequency of the vibrator, stable support, and a structure ideally suited for mass production.

2. Description of the Related Art

A gyroscope for detecting a rotatory angular velocity is used for an inertial navigation system or the like for aircraft and a marine vessel; it is recently being used also for posture control in a motor-vehicle-mounted navigation system, robot or unmanned vehicle and further for a screen vibration preventing apparatus for a TV camera or video camera.

Gyroscopes suited for use in these various fields are required to be compact, and attention is now focused on a vibratory gyroscope.

FIG. 28 shows a basic structure of this type of vibratory gyroscope. This vibratory gyroscope has a column-shaped vibrator 1 made of constantly elastic alloy (elinvar), to which a driving piezoelectric element 2 and a detecting piezoelectric element 3 are attached. When the vibrator 1 is rotated around an axis O while applying bending vibration to the vibrator 1 in the direction of axis x by the driving piezoelectric element 2. Coriolis force works in the direction of axis y. The bending vibration in the direction of axis y applied to the vibrator 1 by the Coriolis force is detected as a voltage through the piezoelectric element 3.

If the mass of the vibrator 1 is taken as m, the vibration velocity of the vibrator 1 in the direction of axis x given by the driving piezoelectric element 2 as v (vector value), and the angular velocity centering around axis O as ω (vector value), then Coriolis force F (vector value) will be as follows:

$$F = 2 m(v \times \omega) \quad (\times: \text{Vector product})$$

Coriolis force F is proportional to the angular velocity ω. The distorted vibration of the vibrator 1 in the direction of axis y caused by the Coriolis force F is converted into a voltage through the detecting piezoelectric element 3, and the angular velocity ω is determined from the detected voltage.

The gyroscope shown in FIG. 28, however, uses expensive constantly elastic metal, which is machined into a column shape; therefore, the yield of the material is low and the machining cost is high because of the need of machining into a column shape with high accuracy. Further, in this type of gyroscope, the resonance frequency at the time when the vibrator 1 is bent and vibrated by the driving piezoelectric element 2 must be adjusted. Accordingly, a part of the column-shaped vibrator 1 must be shaved for the adjustment, making the adjusting work extremely complicated.

The inventors of the present invention, therefore, studied a conventional tuning fork, which employs a vibrator 4 made of a plate-shaped constantly elastic metal as shown in FIG. 29. This gyroscope has a slit 4a formed at the center of the distal end of the vibrator 4, the plate being split into two pieces, namely, elastic arms 4b and 4c. As shown in FIG. 30(A), the piezoelectric element is used to vibrate the elastic arms 4b and 4c in the direction of the plate surfaces at a specific resonance frequency. The amplitude of the vibration of the elastic arm 4b is in the opposite phase from that of the elastic arm 4c at a given point, the phases being indicated by a +x direction and a −x direction. With such a vibration applied, when the vibrator 4 is given a rotation around the axis O, the elastic arms 4b and 4c develop deformation in the directions of +y and −y due to Coriolis force as shown in FIG. 30(B). The angular velocity ω can be determined by detecting the deformation through the detecting piezoelectric element and converting it into a voltage.

However, the vibratory gyroscope using the plate-shaped, conventional tuning fork type vibrator 4 shown in FIG. 29 and FIG. 30 presents the following problems:

(1) In the two-tine tuning fork type, the two elastic arms 4b and 4c must be trimmed separately to adjust the resonance frequency for driving, thus leading to complicated resonance frequency adjustment work. In addition, there is a fear of shaping the elastic arms 4b and 4c asymmetrically while making the adjustment; asymmetrical elastic arms 4b and 4c cause a torsion in the vibrator 4 or a vibration node at the asymmetrical point, preventing well-balanced and highly accurate detection of the deformation by Coriolis force shown in FIG. 30(B).

(2) In the conventional tuning fork, when Coriolis force causes the elastic arms 4b and 4c to develop distorted vibration in a y direction, the nodal lines of the vibration appear at points (a) and (b). Hence, the vibrator 4 needs to be cantilevered by a support bar 5, for example, at the center on the trailing end, limiting the support structure. The cantilever support using the support bar 5 is unstable in mechanical support strength, causing the vibrator 4 to be susceptible to external vibration.

SUMMARY OF THE INVENTION

Accordingly, the present invention intends to solve the problems described above, and it is the first object of the invention to provide a vibratory gyroscope with a structure, which permits easy frequency adjustment and minimizes the chance of asymmetry resulting from the adjustment.

It is the second object of the present invention to ensure stable support of a vibrator.

It is the third object of the present invention to achieve a vibratory gyroscope suited for mass production by adopting a plate type vibrator.

A vibratory gyroscope according to the present invention includes a vibrator, which has three elastic arms divided by two slits, a driving means for causing at least one elastic arm to vibrate, and a detecting means for detecting a vibration component, which takes place in an elastic arm in the direction intersecting with the aforesaid vibrating direction when the vibrator rotates. The vibrator is made of, for example, a constantly elastic metal, and the driving means and the detecting means include piezoelectric elements connected to the constantly elastic metal.

Further, the vibratory gyroscope according to the present invention is provided with a vibrator having three elastic arms, which are made of piezoelectric materials and are separated by two slits, a driving electrode for causing at least one elastic arm to vibrate, and a detecting electrode, which detects vibration component, which takes place in an elastic arm in the direction intersecting with the aforesaid vibrating direction when the vibrator rotates.

In the means described above, if the vibrator is shaped like a flat plate and the direction of the thickness of the plate is taken as the y direction, while the direction along the plate surface as an x direction, then a structure can be achieved, wherein the foregoing slits are formed penetrating in the y direction, with the elastic arms being divided into the x direction. When the vibrator is shaped like a flat plate, the vibration of the elastic arms in the y direction exhibits higher resonant vibration than the vibration in the x direction.

Moreover, if the elastic arms on both sides vibrate, being deformed in an opposite direction from that of the middle elastic arm, the vibrator can be supported by a rigid body at a base on the extended lines of at least the slits. In this case, if the depth of the slits is taken as L3 and the length in the same direction as that of the L3 of a portion, wherein no slits are formed and no supporting rigid body is present, is taken as L0, then L0/L3 is preferably 0.6 or more, and further preferably, L0/L3 is between 0.8 and 1.0.

DESCRIPTION OF THE PREFERRED EMBODIMENTS

The present invention will now be described with reference to the attached drawings.

Figure 10:
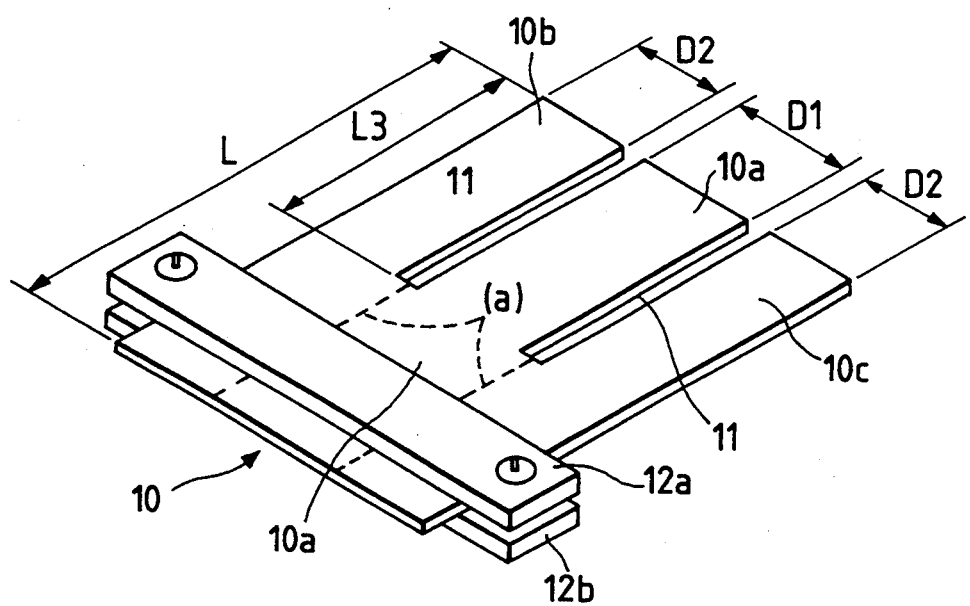
FIG. 10 is a perspective view of a first embodiment, which provides a vibratory gyroscope of the mode A vibration.
Figure 11:
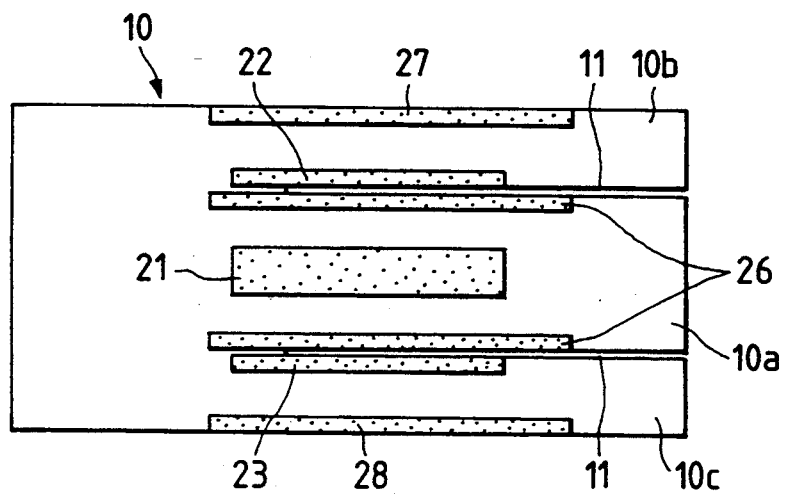
FIG. 11 is a plan view of a vibrator of the first embodiment.
Figure 12:
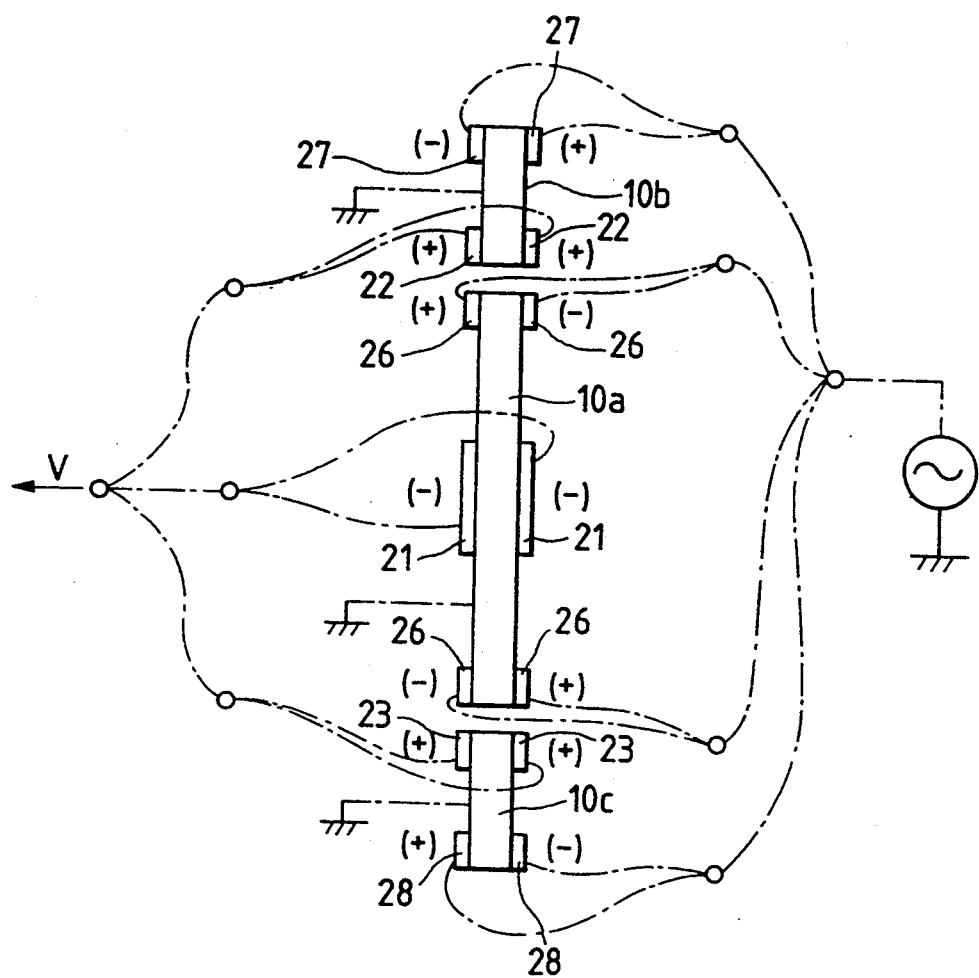
FIG. 12 is an end surface view of the vibrator, showing a driving means, a detecting means, and a circuit configuration of the first embodiment.
Figure 13A:
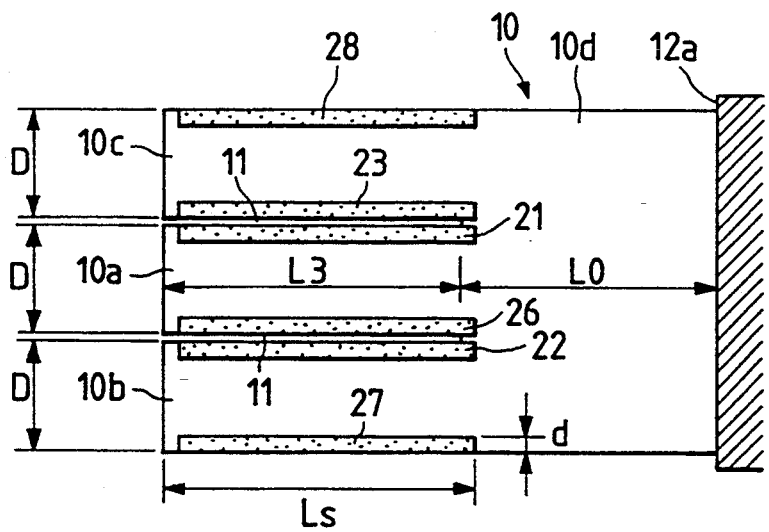
FIG. 13(A) is a plan view and FIG. 13(B) is a side view of a vibrator of another structure of the first embodiment.
Figure 20:
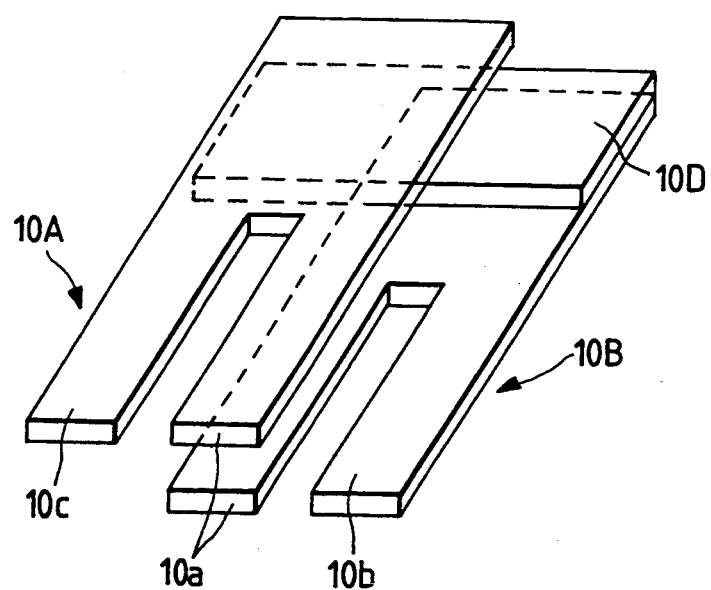
FIG. 20 is a perspective view of a vibrator with a simplified structure.
Figure 21:
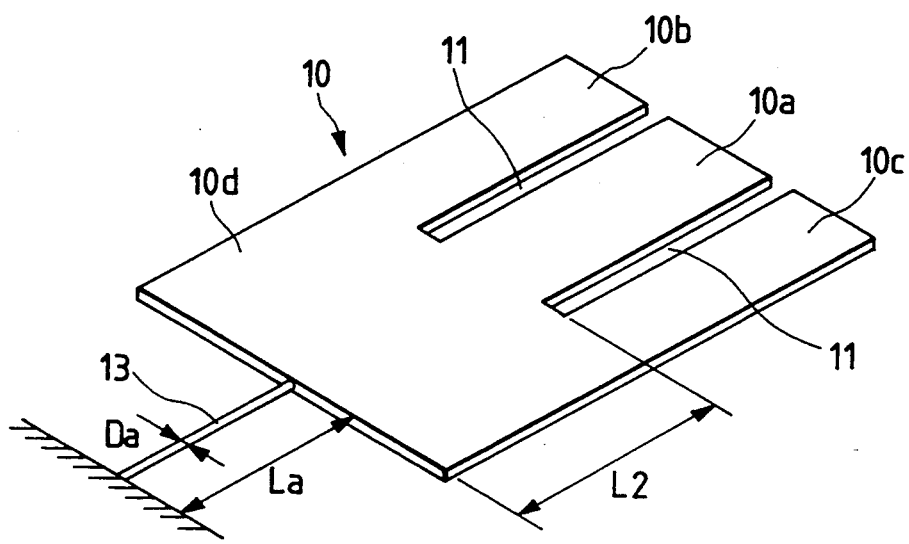
FIG. 21 is a perspective view of a second embodiment, which provides a vibratory gyroscope of the mode B vibration.
Figure 22A:
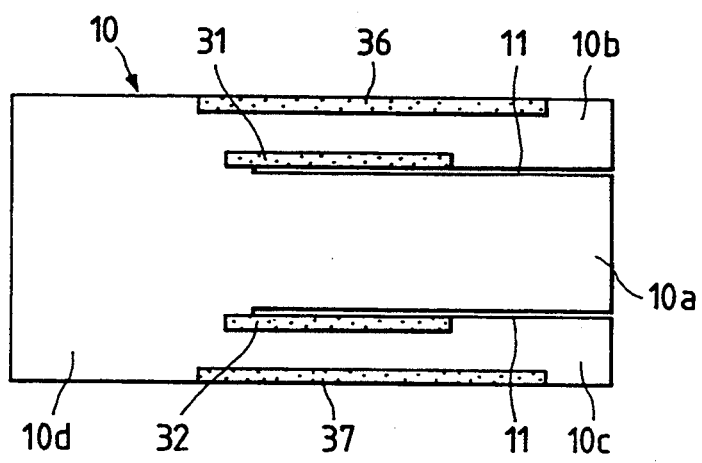
FIG. 22(A) is a plan view of a vibrator of the second embodiment.
Figure 22B:
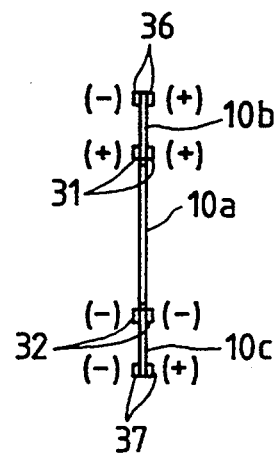
FIG. 22(B) is an end surface view thereof.
Figure 24:
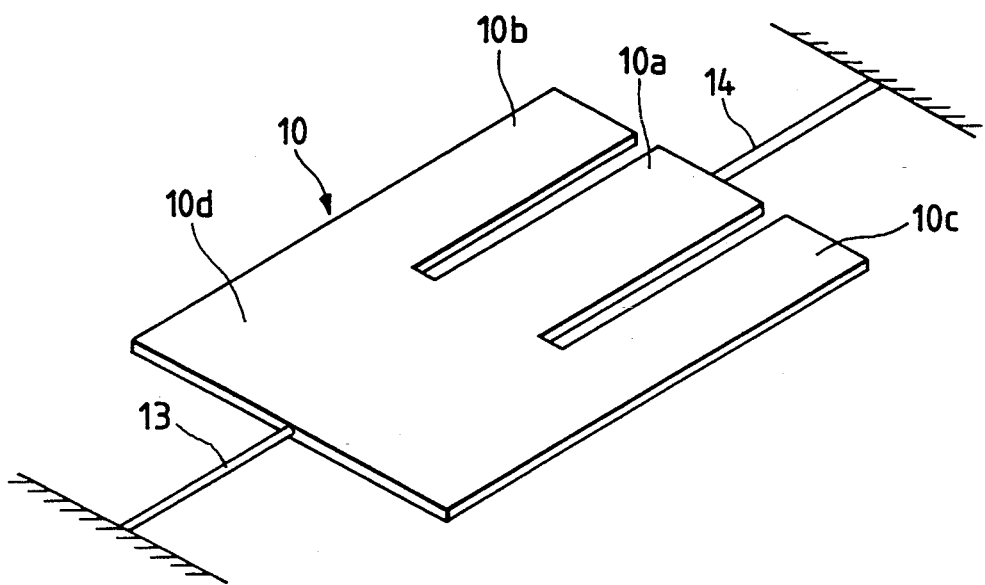
FIG. 24 is a perspective view showing a third embodiment, which provides a gyroscope of mode B, wherein the central part of the vibrator is supported on both ends.
Figure 25:
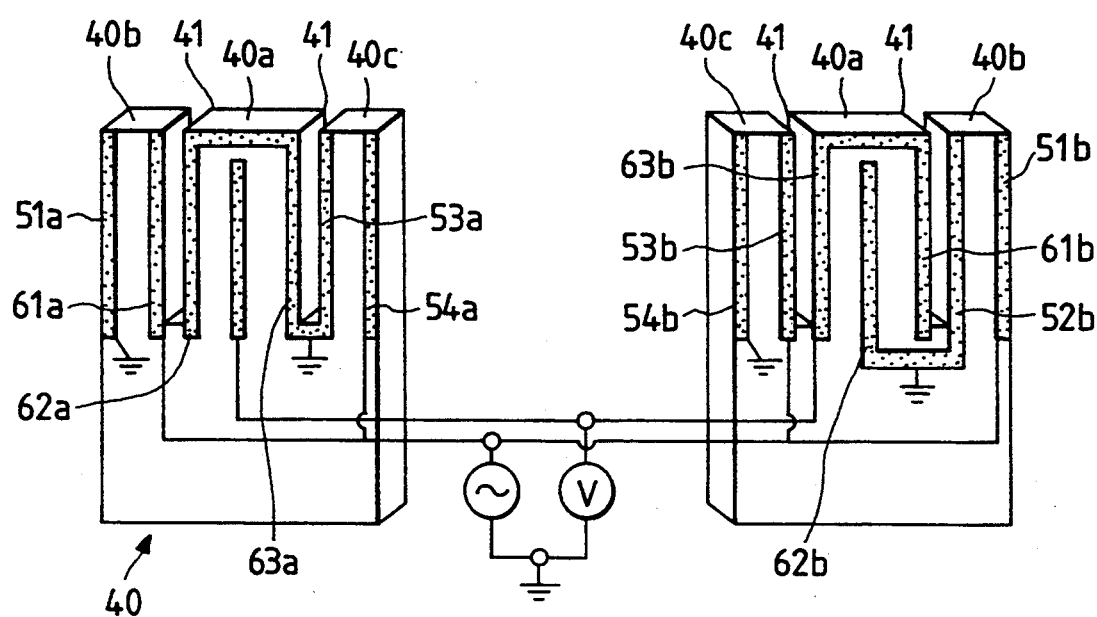
FIG. 25 is perspective views showing, from both front and back sides, a vibrator of a fourth embodiment formed with piezoelectric material.
Figure 26:
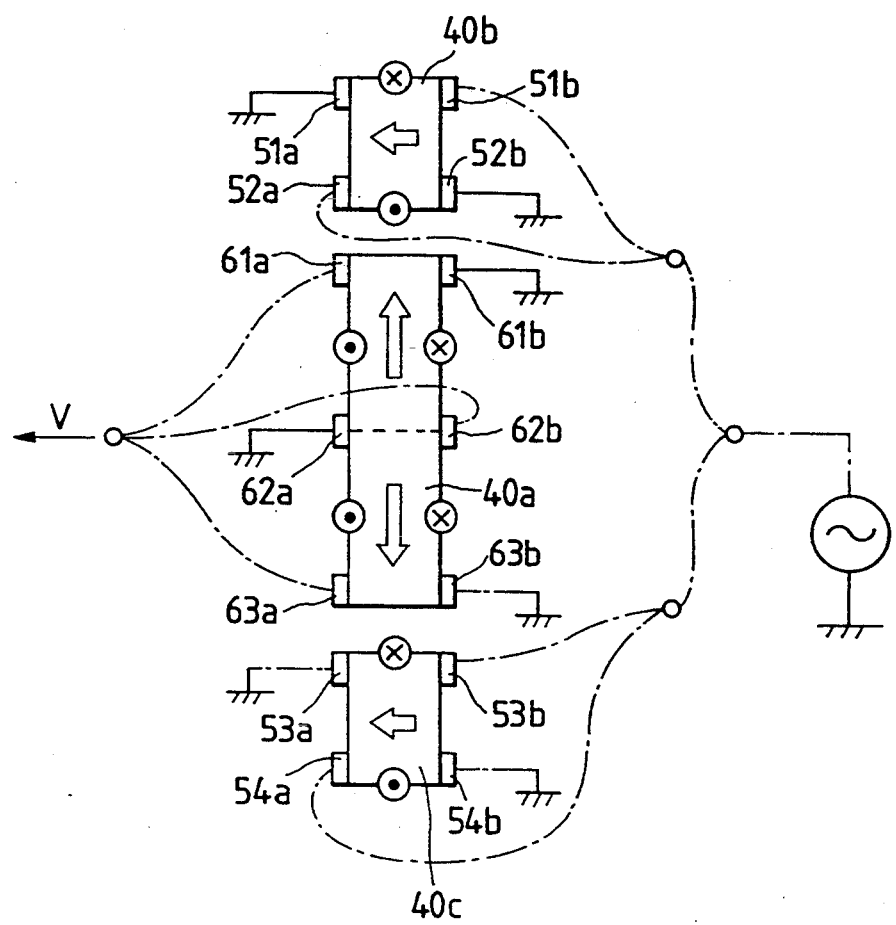
FIG. 26 is an end surface view of the vibrator, which illustrates the layout of a driving electrode and a detecting electrode in the fourth embodiment.
Figure 27:
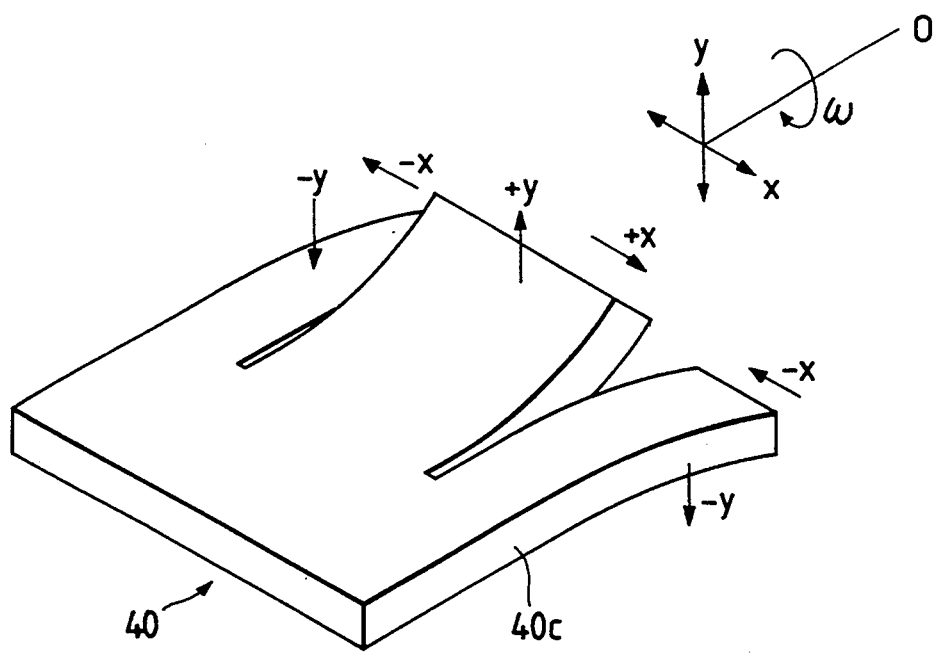
FIG. 27 is a perspective view showing the deformation of the vibrator of the fourth embodiment at a certain point.
Figure 28:
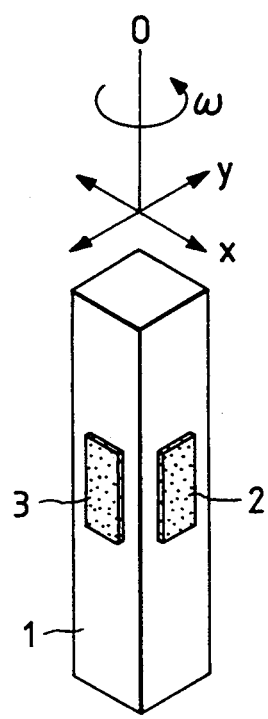
FIG. 28 is a perspective view showing the vibrator of a conventional vibratory gyroscope.
Figure 29:
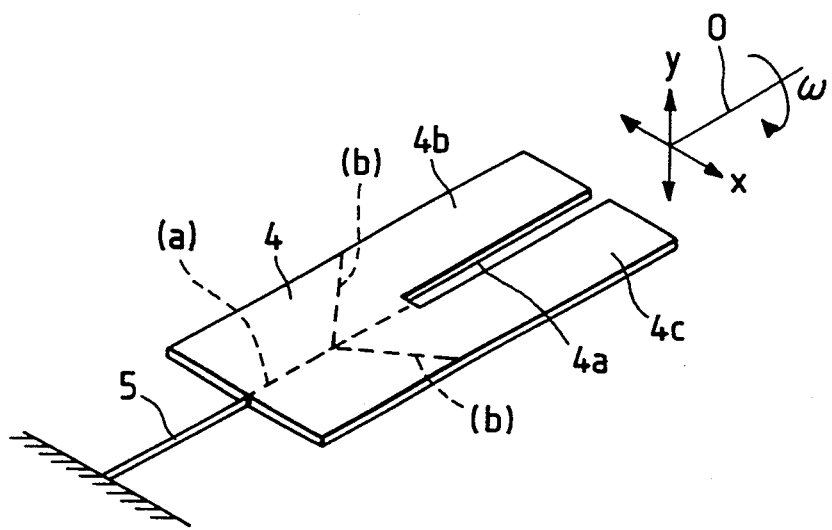
FIG. 29 is a perspective view showing a conventional tuning fork made of plate material.
Figure 30A:
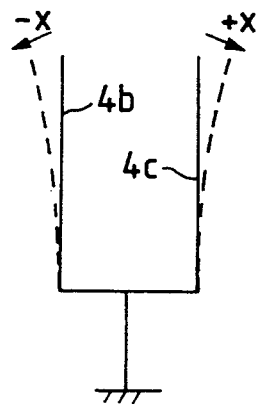
FIG. 30(A) is a schematic diagram showing the vibrator of FIG. 29, which is being driven and vibrating, and FIG. 30 (B) is a schematic diagram illustrating deformation caused by Coriolis force.
Figure 30B:
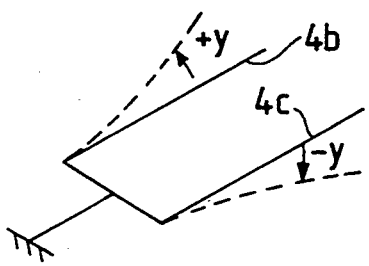

FIG. 10 is the perspective view of the vibratory gyroscope according to the first embodiment of the present invention; FIG. 11 is the plan view of the vibrator thereof; FIG. 12 is the end surface view of the vibrator, showing the driving means, detecting means, and circuit configuration thereof; FIG. 13(A) is the plan view showing another structure of the vibrator of the first embodiment, and FIG. 13 (B) is the side view thereof; FIG. 14 is the end surface view of the vibrator, illustrating the driving means, detecting means, and circuit configuration in the structure shown in FIG. 13; FIG. 15 is the chart showing the driving and detecting characteristics obtained from the structure shown in FIG. 13; FIG. 16 through FIG. 19 are the charts illustrating the electromechanical coupling coefficient characteristics obtained from the structure shown in FIG. 13; FIG. 20 is the perspective view illustrating the structure of the vibrator formed by further simplifying the structure shown in FIG. 13; FIG. 21 is the perspective view of the vibratory gyroscope according to the second embodiment; FIG. 22(A) is the plan view of the vibrator thereof and FIG. 22(B) is the end surface view of the vibrator for illustrating the driving means and the detecting means; FIG. 24 is the perspective view of the vibratory gyroscope according to the third embodiment of the present invention; FIG. 25 gives the perspective views showing, from the front and back sides, the vibrator of the vibratory gyroscope according to the fourth embodiment of the present invention; FIG. 26 is the end surface view illustrating the circuit configuration for driving the vibrator and detecting the vibration; and FIG. 27 is the perspective view showing the vibrating condition of the vibrator of the fourth embodiment.

FIG. 1 through FIG. 9, and FIG. 23 serve to illustrate the basic structure and functions of the vibrator constituting the vibratory gyroscope and also to explain that the aforesaid embodiments are optimum embodiments.

Figure 1A:
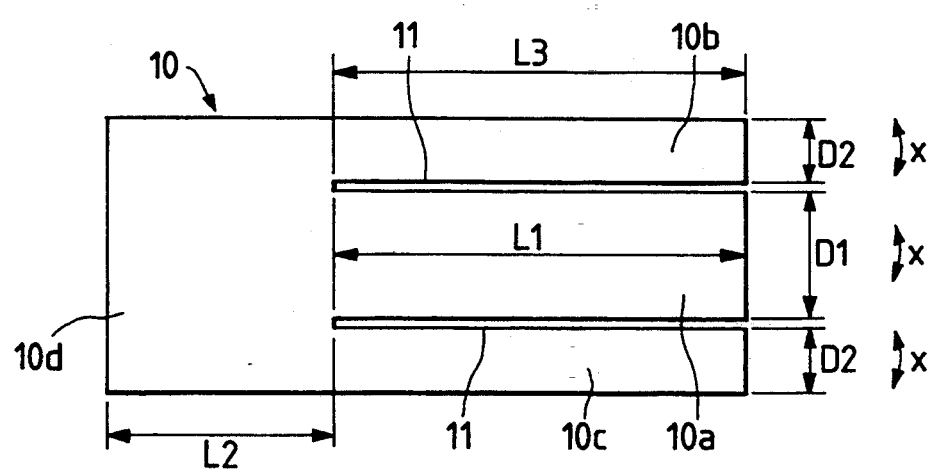
FIG. 1(A) is a plan view showing the configuration of the vibrator.
Figure 1B:
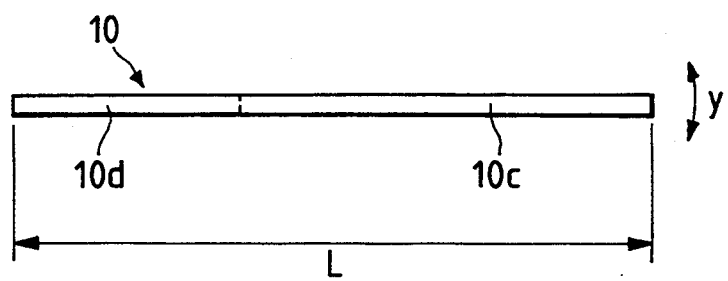
FIG. 1(B) is a side view thereof.
Figure 2:
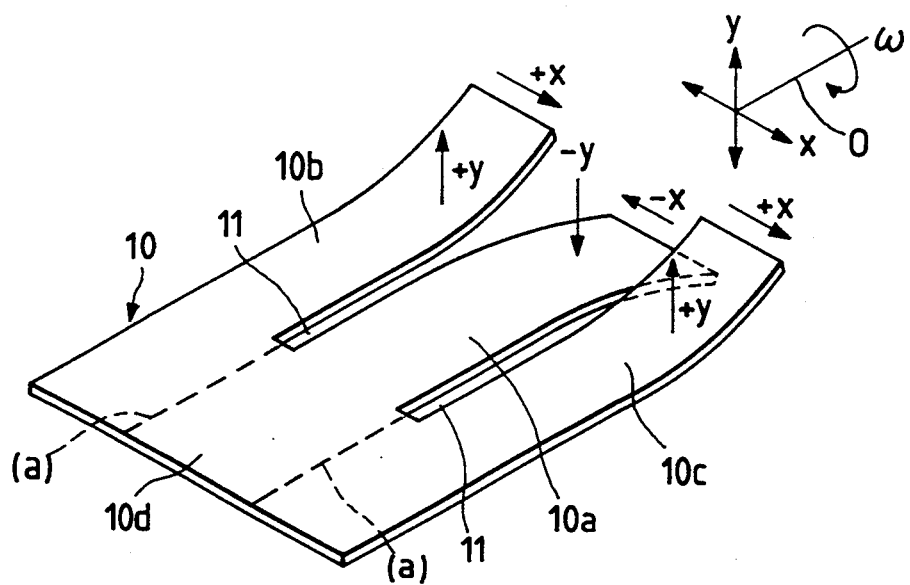
FIG. 2 is a perspective view of the vibrator, showing mode A, wherein adjoining elastic arms vibrate in phases opposite from each other.

The inventors of the present invention studied configuring the vibratory gyroscope by using a plate-shaped, trident-type tuning fork vibrator 10 shown in FIG. 1(A) (plan view) and FIG. 1(B) (side view). The vibrator 10 is made of the constantly elastic alloy (elinvar) shaped into a flat plate. The constantly elastic alloy (elinvar) is a material which exhibits almost no change in Young's modulus with respect to temperature changes at around room temperature; it is an alloy of, Fe (iron), Cr (chromium), Ni (nikel) and Ti (titanium):

In each of the following embodiments, the direction of the plate thickness of the plate-shaped vibrator is indicated by y and the direction along the surface of the plate, which intersects with the plate thickness direction y, is indicated by x. In addition, as shown in FIG. 2, the rotatory angular velocity of the vibrator on an x-y plane is denoted by $\omega$.

As shown in FIG. 1, the vibrator 10 has two slits 11, 11 of the same length cut in from one end of a constantly elastic metal plate. The slits 11, 11, which are cut, penetrating in the direction of the plate thickness (y direction) of the plate, form a middle elastic arm 10a and the right and left elastic arms 10b, 10c by separating them in the x direction. In FIG. 1, the full length of the vibrator 10 is denoted by L, the length of the middle elastic arm 10a by L1, the full length of a base 10d, in which no slit is formed, by L2, and the depth of both slits, 11, 11 by L3.

When all the elastic arms 10a, 10b, and 10c, or one elastic arm or two elastic arms are resonated and vibrated at a predetermined frequency in, for example, the direction of the plate surface (x direction) and the vibrator 10 is rotated, the elastic arms 10a, 10b, and 10c are resonated and vibrated, being deformed in the direction of the plate thickness (y direction) by Coriolis force. As shown in the formula above, Coriolis force is proportional to the angular velocity ($\omega$); therefore, the angular velocity ($\omega$) can be detected by converting the amount of deformation, which is caused by the vibration of the elastic arms in the y direction, into a voltage through, for example, a piezoelectric element.

The vibration mode (amplitude phase), in which the elastic arms vibrate and deform in the y direction by Coriolis force comes in the mode shown in FIG. 2 (hereinafter referred to as mode A) and the mode shown in FIG. 4 (hereinafter referred to as mode B).

In mode A shown in FIG. 2, the elastic arms 10b and 10c are both driven so that the amplitude directions thereof both become +x at a given point and the then amplitude direction of the middle elastic arm 10a becomes −x. At this time, when the vibrator 10 is rotated around axis O at the angular velocity $\omega$, Coriolis force is generated, causing deformation and vibration so that the amplitude directions of the elastic arms 10b and 10c are both +y, while the amplitude direction of the middle elastic arm 10a is the opposite direction, −y. In FIG. 2, the elastic arms 10b, 10c on both sides and the middle elastic arm 10a are driven to vibrate in direction ±x so that the vibration phases thereof are opposite from each other. Driving the elastic arms as described below will also cause the mode A vibration.

First, without driving the middle elastic arm 10a, the elastic arms 10b and 10c on both sides are vibrated and driven so that they have the same phase and the amplitude directions thereof become +x at a given point. At this time, the reaction force of the vibration of the elastic arms 10b and 10c in the +x direction causes the middle elastic arm 10a to vibrate in the −x direction, in the opposite phase from that of the elastic arms 10b and 10c. Rotating the vibrator 10 around axis O at the angular velocity $\omega$ at this time generates Coriolis force, which in turn generates vibration, causing the vibration directions of the elastic arms 10b and 10c to become +y at a given point and the then amplitude direction of the middle elastic arm 10a to become the opposite, namely, −y. In this case also, mode A is engaged.

Figure 4:
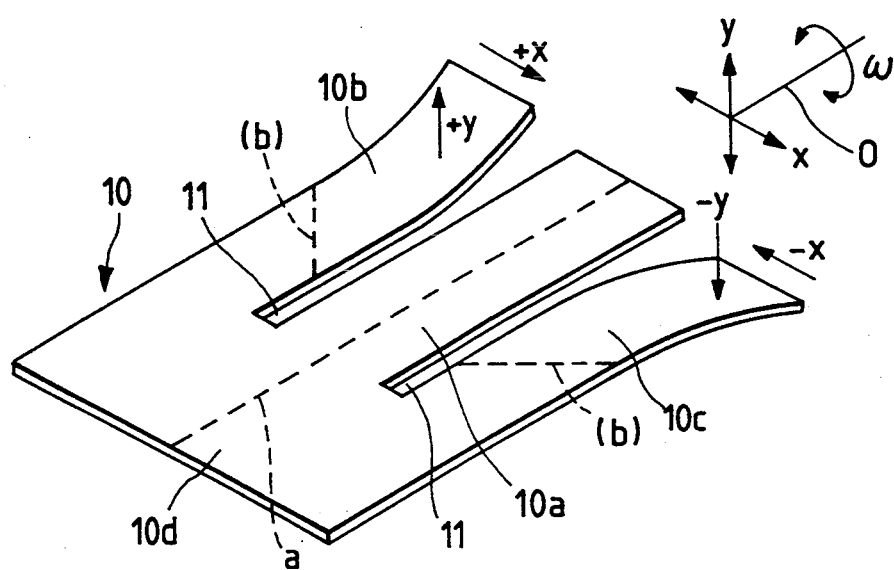
FIG. 4 is a perspective view illustrating the vibrator in mode B, wherein the middle elastic arm does not vibrate.

In mode B shown in FIG. 4, the middle elastic arm 10a is not driven but set in a neutral condition, while the right and left elastic arms 10b and 10c are vibrated in the opposite phases from each other. In other words, mode B shows a case, wherein the amplitude direction of the elastic arm 10b at a certain point is +x, while that of the elastic arm 10c is −x. At this time, Coriolis force causes deformation from the vibration so that the amplitude direction of the elastic arm 10b is +y, while the amplitude direction of the elastic arm 10c is −y at the same point. The middle elastic arm 10a is in the neutral condition and it does not vibrate in the y direction.

In mode A and mode B above, when the elastic arms of the vibrator are driven in the x direction to resonate, vibrate and rotate, the elastic arms resonate and vibrate in the y direction due to Coriolis force. Therefore, the angular velocity can be determined by detecting the vibration in the y direction. Or reversely, the elastic arms of the vibrator are driven in the y direction to resonate and rotate, thereby causing the elastic arms to vibrate in the x direction by Coriolis force. By detecting the vibration, the angular velocity can be detected.

Figure 6:
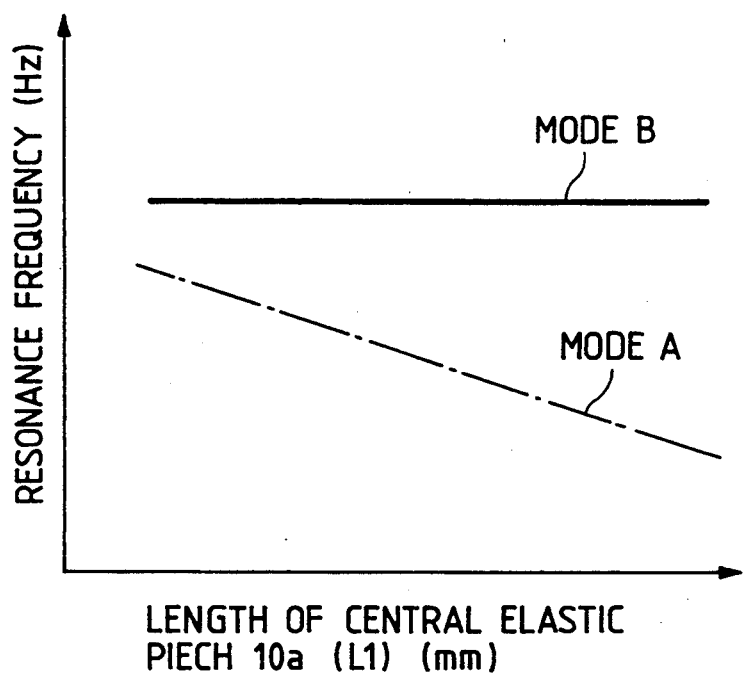
FIG. 6 is a chart illustrating the changes in the resonance frequency, which are observed when the length of the middle elastic arm is changed.

The adjustment of the frequency of the resonant vibration of the elastic arms in the y direction will now be discussed in both mode A and mode B. FIG. 6 shows the changes in the resonance frequency in a non-support state when only a length L1 of the middle elastic arm 10a is changed in mode A and mode B, respectively. It is seen that in mode B, the middle elastic arm 10a is not vibrating; therefore, the length L1 of this elastic arm 10a does not effect the resonance frequency, while in mode A, changing only the length L1 of the middle elastic arm 10a causes the resonance frequency to change proportionally. In other words, in mode A shown in FIG. 1, simply by cutting the distal end of the middle elastic arm 10a and to change the length L1 thereof makes it possible to freely adjust the resonance frequency. Increasing L1 decreases the resonance frequency, and cutting the distal end of the middle elastic arm 10a to make it shorter increases the resonance frequency.

Figure 7:
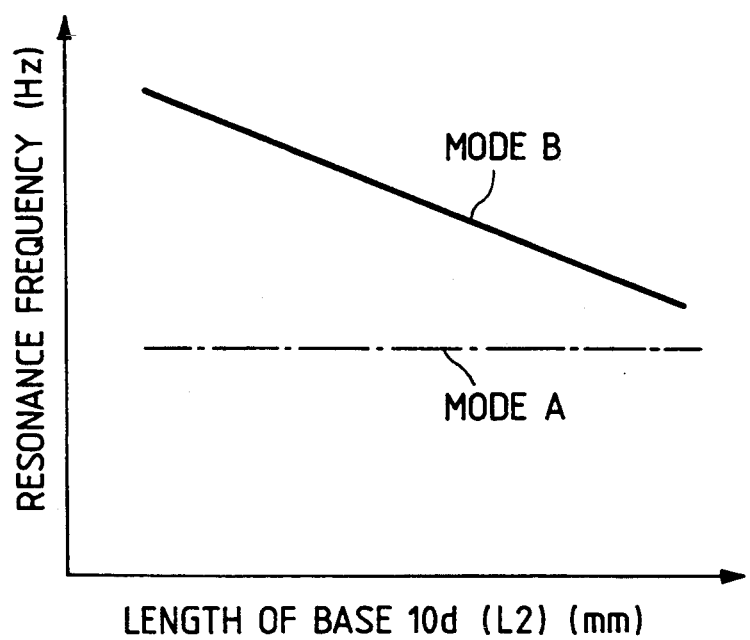
FIG. 7 is a chart illustrating the changes in the resonance frequency, which are observed when the length of the base is changed.

FIG. 7 shows the relationship between a length L2 of a base 10d with no slit 11 and the resonant vibration frequency in the y direction. In mode A shown in FIG. 2, the length of the base 10d does not effect the changes in the resonance frequency, while in mode B shown in FIG. 4, the resonance frequency changes proportionally to the changes of the length L2 of the base 10d. Regarding mode B, as shown in FIG. 4, the nodal lines, which appear from the vibration in the y direction, are located in positions indicated by (a) and (b) in mode B. Comparison of the base 10d having a longer L2 shown in FIG. 5(A) with the one having a shorter L2 shown in FIG. 5(B) reveals that the nodal line (b) moves toward the tip (to the right in the drawing) as the dimension L2 of the base 10d shortens. As the nodal line (b) moves toward the distal end, the substantial dimensions of the vibrating portions of the elastic arms 10b and 10c decrease, resulting in a higher resonance frequency. This means that, in mode B, the resonance frequency can be adjusted merely by cutting the trailing end of the vibrator 10 or changing the depth of the slits 11, 11, thereby changing the dimension L2 of the base 10d.

Thus, the adjustment of the resonance frequency of the vibration with the amplitude thereof being in the y direction can be achieved simply by cutting the distal end of the middle elastic arm 10a in mode A shown in FIG. 2, or by cutting the proximal end of the vibrator 10 in mode B shown in FIG. 4, assuring extremely easy adjustment work. Moreover, this adjustment does not disturb the symmetry of the shape of the vibrator 10; therefore, the adjustment work does not lead to twisting vibration caused by an asymmetrical shape of the vibrator.

In addition, adjusting the resonance frequency in the resonant vibration in the y direction described above does not affect the frequency of the resonant vibration of the elastic arms 10a, 10b, and 10c in the x direction. This makes it possible to bring closer the frequency of the resonant vibration of the elastic arms 10a, 10b, and 10c in the y direction and that in the x direction.

The supporting conditions for the vibrator 10 will now be discussed.

Figure 3:
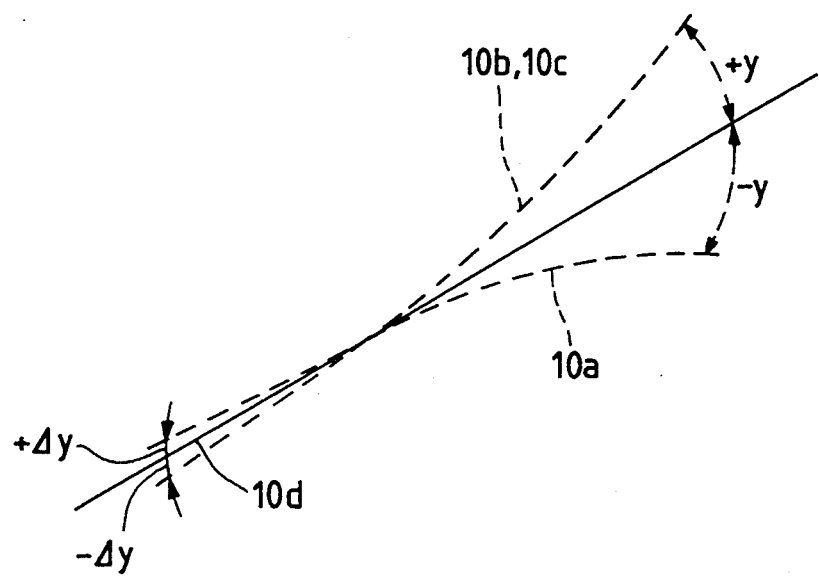
FIG. 3 is a schematic diagram illustrating the amplitude of the base of the vibrator in mode A vibration.

In mode A shown in FIG. 2, regarding the vibration in the y direction, the middle elastic arm 10a, and the elastic arms 10b, 10c on both sides vibrate in phases that are opposite from each other; therefore, the amplitudes $+\Delta y$ and $-\Delta y$ at the proximal end of the base 10d with no slits 11, 11 take extremely small values (see FIG. 3). For example, if the depth L3 of the slits 11, 11 is 40 mm and the dimension L2 of the base 10d ranges from 10 mm to 30 mm, then the ratio of an amplitude y at the distal end of the elastic arms to an amplitude $\Delta y$ at the proximal end of the base 10d is approximately $\pm 0$ to $10^{-3}$ for $\pm 1.0$.

Hence, in mode A, wherein the elastic arms 10b, 10c on both sides are vibrated in an opposite phase from that of the middle elastic arm 10a, whatever length L2 the base 10d may take in relation to the depth L3 of the slits 11, 11, it does not exert significant influences on the vibration mode of the elastic army 10a, 10b, and 10c when the base 10d is supported by being held between rigid bodies. This enables a support structure, wherein the proximal end part of the base 10d of the vibrator is held between rigid bodies 12a and 12b as shown in FIG. 10. When, however, the base 10d is held between the rigid bodies, a length L0 of the base 10d, which is not supported by the rigid bodies (see FIG. 13), exerts influences on the electromechanical coupling coefficient and quality factor (Q value) of the resonant vibration of the vibrator in the x direction. This will be explained in an embodiment to be discussed later, referring to FIG. 16 and FIG. 19.

It is not always necessary to hold the full width of the base 10d between the rigid bodies 12a and 12b. In mode A of FIG. 2, the nodal line (a) of vibration is on an extended line of the slits 11, 11; therefore, just holding the base 10d between the rigid bodies at two points on the extended line of the slits 11, 11 makes it possible to hold the vibrator 10 in an adequately stable state.

Figure 5A:
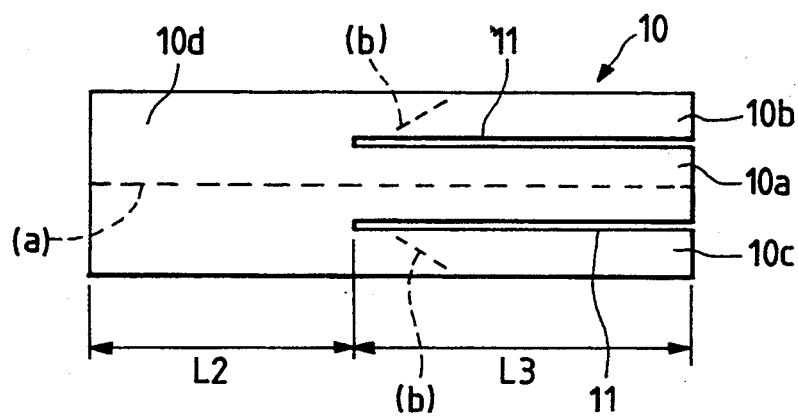
FIG. 5(A) and 5(B) are plan views of the vibrator, illustrating the changes in the positions of the nodal lines, which are observed when the length of the base is changed in mode B.
Figure 5B:
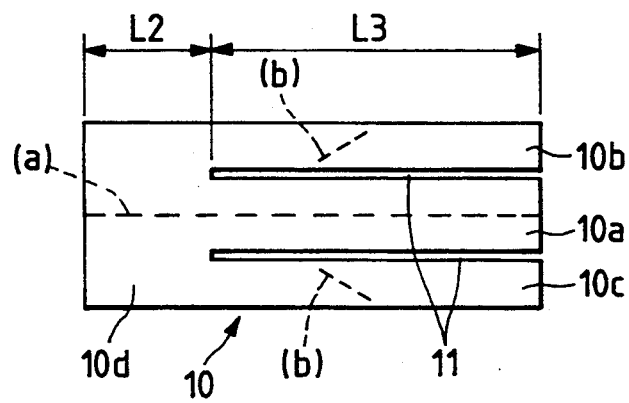

In mode B shown in FIG. 4, as shown in FIG. 4 and FIGS. 5(A) and 5(B), nodal lines (a) and (b) become symmetrical to the center line of the vibrator, making it impossible to always support the whole base 10d between the rigid bodies as shown in FIG. 10. In this case, the central part of the proximal end of the base 10d should be supported by a support bar 13 as shown in FIG. 21.

Figure 23:
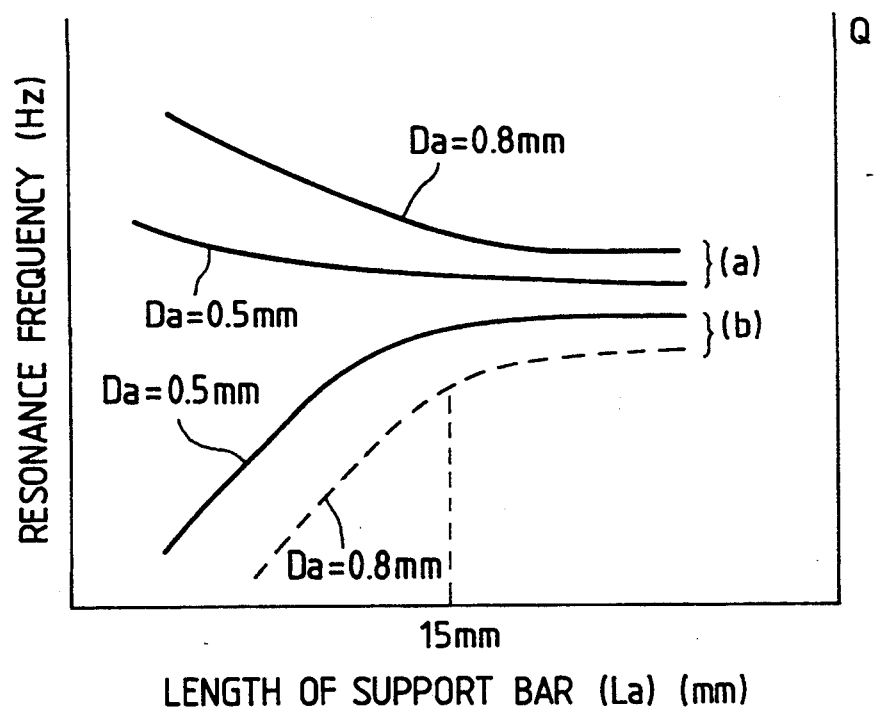
FIG. 23 is a chart showing the relationship between the length and diameter of the support bar and the resonance frequency in mode B.

However, a length La and the dimension of a diameter Da of the support bar 13 influence the changes in the resonance frequency of the vibration of the elastic arms in the y direction. In FIG. 23, (a) shows the relationship between the length La of the support bar 13 and the resonance frequency of the vibrator when the diameter Da of the bar is 0.5 mm and 0.8 mm, respectively. Accordingly to this chart, as the dimension La of the support bar 13 increases, the changes of the La exert less influences on the resonance frequency of the vibrator. Likewise, as the diameter Da of the support bar 13 decreases, the changes of Da exert less influences on the resonance frequency. Hence, it is necessary for the support bar 13 to have a certain length, preferably 0.5 mm or less, for example.

As shown in FIG. 21, however, the structure, wherein only one end of the vibrator 10 is supported by the support bar 13, provides low mechanical supporting strength and the elastic arms of the vibrator are susceptible to external vibration. The mechanical strength can significantly be improved by adopting a structure, wherein the center of the base 10d and the center of the end of the middle elastic arm 10a of the vibrator 10 are supported on both sides by the support bar 13 and a support bar 14 as shown in FIG. 24. In this case, the length and diameter of the support bars 13 and 14 also influence the resonance frequency; therefore, these dimensions must be set to optimum values.

Even in mode B shown in FIG. 4, however, if the depth L3 of the slits 11, 11 is ⅓ or less of a full length L, then the amplitude of the proximal end of the base 10d is extremely small and nearly zero. Accordingly, as long as the depth L3 of the slits stays ⅓ or less of the full length L, the supporting structure, wherein the rigid bodies 12a and 12b are used for support, is available as in the case shown in FIG. 10 even in mode B.

In the vibratory gyroscope, the accuracy for detecting the vibration of the elastic arms in the y direction is related to the quality factor (Q value) of the vibration of the elastic arms in the y direction. The resonance sharpness obtained when the elastic arms vibrate in the y direction in mode A and mode B will now be discussed.

First, in mode A shown in FIG. 2, the relationship between width D1 of the middle elastic arm 10a and width D2 of the elastic arms 10b and 10c on both sides greatly affects the resonance sharpness. This means that the difference between the mass or moment of inertia of the elastic arm 10a and the mass or moment of inertia of the elastic arms 10b and 10c is deeply related to the quality factor when the elastic arm 10a and the elastic arms 10b, 10c are vibrating in the y direction in opposite phases from each other.

Hence, a vibrator, wherein D1 and D2 have the same width, and another vibrator, wherein the width of D1 is double that of D2, were produced and the elastic arms of these vibrators were vibrated in the y direction in mode A to measure the quality factor (Q value). As a result, it was found that the quality factor (Q value) in the vibrator, wherein D1 is double D2, is improved to nearly double compared with the vibrator, wherein D1 is equal to D2. This means that in mode A, the width D1 of the middle elastic arm 10a should preferably be set to a value nearly double the width D2 of the elastic arms 10b and 10c on both sides.

In mode A, however, if the width of the middle elastic arm 10a and the width of the elastic arms 10b, 10c on both sides are set to the same dimension D (see FIG. 13), then it becomes possible to bring closer the resonance frequency in the x direction and the resonance frequency in the y direction. In other words, if the widths of the middle elastic arm 10a and of the elastic arms 10b, 10c on both sides are set to the same D and the elastic arms are vibrated in the x direction in the first resonance mode and in the y direction in the second resonance mode, then the frequencies in the x direction and the y direction in the two resonance modes can be brought close to each other, resulting in a preferable vibratory gyroscope.

In this case, setting the length L0 of the portion of the vibrator 10, which has no slits 11 formed and which is not supported by the rigid bodies, and the depth L3 of the slits 11, to a certain ratio improves or stabilizes the electromechanical coupling coefficient of the resonant vibration of the vibrator in the x direction and the quality factor (Q value). FIG. 13 shows the vibrator in this case as a preferable embodiment. FIG. 16 through FIG. 19 illustrate the relationship between the ratios of the above dimensions and the electromechanical coupling coefficients.

In the case of mode B of FIG. 4, as shown in (b) of FIG. 23, the quality factor (Q value) obtained when the elastic arms of the vibrator vibrates in the y direction is affected by the length La and the diameter Da of the support bar 13. FIG. 23(b) illustrates the relationship between the length La of the support bar 13 and the Q value when the diameter Da of the support bar 13 is 0.5 mm and 0.8 mm, respectively. According to (b) of FIG. 23, the deterioration of the quality factor (Q value) can be prevented by setting the length La of the support bar 13 to, for example, 15 mm or more and the diameter Da to, for example, 0.5 mm or less. The same trend is observed in the one, which is supported by the support bars 13 and 14 on both ends as shown in FIG. 24.

The vibration modes such as the first and second mode of the elastic arms will now be described.

Figure 8:
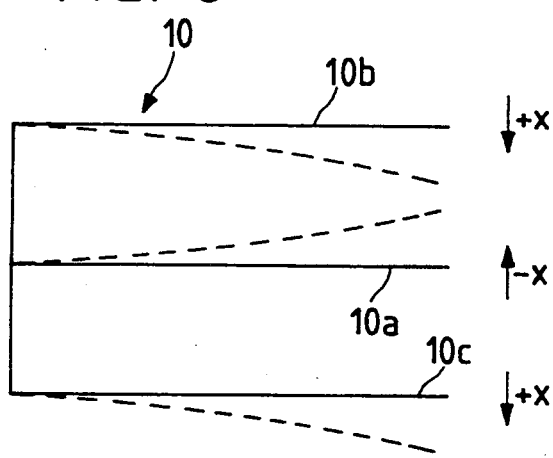
FIG. 8 is a schematic illustration showing a state, wherein the elastic arms are driven in direction x in the first vibration mode.
Figure 9A:
FIG. 9(A) is a schematic illustration showing a state, wherein the elastic arms are driven in direction y in the second vibration mode.
Figure 9B:
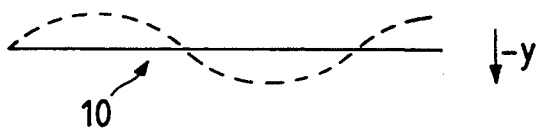
FIG. 9(B) is a schematic illustration showing a state, wherein they are driven in the third vibration mode.

FIG. 8 shows in dotted lines the deformation of each of the elastic arms 10a, 10b, and 10c in the x direction at a certain point in mode A mentioned above, while FIG. 9(A) and (B) show the deformation of the elastic arms in the y direction.

Each of the elastic arms 10a, 10b, and 10c is driven in the x direction by driving means such as piezoelectric elements, and they are resonated in the first vibration mode as shown in FIG. 8. When the elastic arms are vibrated in the y direction by Coriolis force, they resonate in the second vibration mode shown in FIG. 9(A) or the third vibration mode shown in FIG. 9(B) or a higher-order vibration mode. The same applies when the elastic arms 10a, 10b, and 10c are vibrated and driven in the y direction by such driving means as piezoelectric elements and the elastic arms vibrate in the x direction due to Coriolis force.

The use of the plate-shaped vibrator is characterized by the resonance in the y direction being in a higher order than the resonance in the x direction. The use of the plate-shaped vibrator permits mass production of vibrators with a higher material yield at lower cost and also allows easy trimming for adjustment. In addition, the frequency of the resonant vibration in a predetermined order in the y direction and the frequency of the resonant vibration in the x direction in a lower-order resonant mode can be brought closer mainly by setting the widths of the elastic arms.

The same applies when the elastic arms are vibrated in the x direction in the second or higher resonant mode and are vibrated in the y direction in the third or fourth resonant vibration mode.

Further, in the plate-shaped vibrator, the resonant vibration in the y direction has a higher order than the resonant vibration in the x direction also in mode B.

FIG. 10 through FIG. 12 illustrate the first embodiment of the vibratory gyroscope, wherein the vibration mode is mode A shown in FIG. 2 in accordance with the study results described above.

As shown in FIG. 11 and FIG. 12, the middle elastic arm 10a is provided with two pairs of driving piezoelectric elements 26 as the driving means on both front and back surfaces. Likewise, the elastic arms 10b and 10c on both sides are provided with pairs of driving piezoelectric elements 27, 28, each pair being attached as the driving means to the front and back surfaces, respectively. The direction of polarization of each piezoelectric element is indicated by (+) for the right direction and by (−) for the left direction in FIG. 12. All the piezoelectric elements 26, 27, and 28 are provided with electrodes on the front and back surfaces, the electrodes on one side being electrically conducted in close contact with the surfaces of the elastic arms 10a, 10b, and 10c and grounded via the vibrator 10. Further, as shown in FIG. 12, electric power is supplied from a driving AC power source to the electrodes on the surfaces of the piezoelectric elements 26, 27, and 28.

As a result of the direction of polarization of the driving piezoelectric elements 26, 27, and 28 being set as illustrated in FIG. 12, the middle elastic arm 10a and the right and left elastic arms 10b, 10c vibrate in opposite phases (+/± x directions in amplitude at a given point) from each other as shown in FIG. 2.

A pair of detecting piezoelectric elements 21 is attached as the detecting means to each of the front and back surfaces. The right and left elastic arms 10b and 10c are also provided with pairs of detecting piezoelectric elements 22 and 23 as the detecting means, each pair being mounted on the front and back surfaces. The directions of the polarization of these piezoelectric elements 21, 22, and 23 are shown by (+) and (−) in FIG. 12. The electrodes of the piezoelectric elements 21, 22, and 23 on one side are grounded in close contact with the surfaces of the elastic arms 10a, 10b, and 10c. The outputs from the electrodes on the front surfaces are collected to provide detected voltage V.

When the elastic arms 10a, 10b, and 10c are vibrated and driven, for instance, in the first resonant mode so that the directions of amplitude at given points become +x and −x, respectively, and the vibrator 10 in this state is rotated, Coriolis force works on the elastic arms. The Coriolis force becomes proportional to a vibration speed v (vector value) of the elastic arms 10a, 10b, and 10c in the x direction at a given point, the elastic arms vibrating in, for example, the second resonant mode in the y direction.

When the elastic arms 10a, 10b, and 10c vibrate in the y direction due to Coriolis force, the deformations of the surfaces of the elastic arms are converted into voltages through the aforesaid detecting piezoelectric elements 21, 22, and 23, and they are output as AC powers. In the gyroscope, the angular velocity $\omega$ is calculated based on a sum of the AC powers detected through the detecting piezoelectric elements 21, 22, and 23.

According to the study described above, in mode A, the amplitude of the base 10d with the slits 11, 11 not being formed is extremely small; therefore, the portion of the nodal line (a) of vibration or the full width of the base 10d can be held between the rigid bodies 12a, 12b, thereby assuring extremely stable mechanical support.

Furthermore, to improve the quality factor (Q value), the width D1 of the middle elastic arm 10a should preferably be set to double the width D2 of the right and left elastic arms 10b, 10c.

As shown in FIG. 6, the resonance frequency can be adjusted by changing the length L1 of the middle elastic arm 10a in mode A. Accordingly, the frequency can be adjusted simply by trimming the distal end of the middle elastic arm 10a.

Figure 13B:
Figure 14:
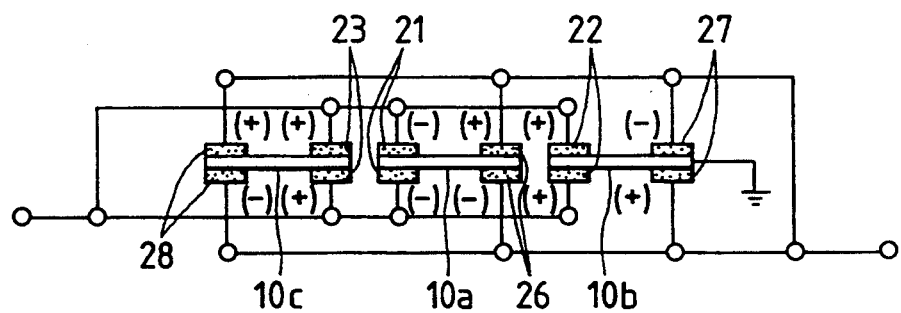
FIG. 14 is an end surface view of FIG. 13(A) showing the driving means, the detecting means, and the circuit configuration.
Figure 15:
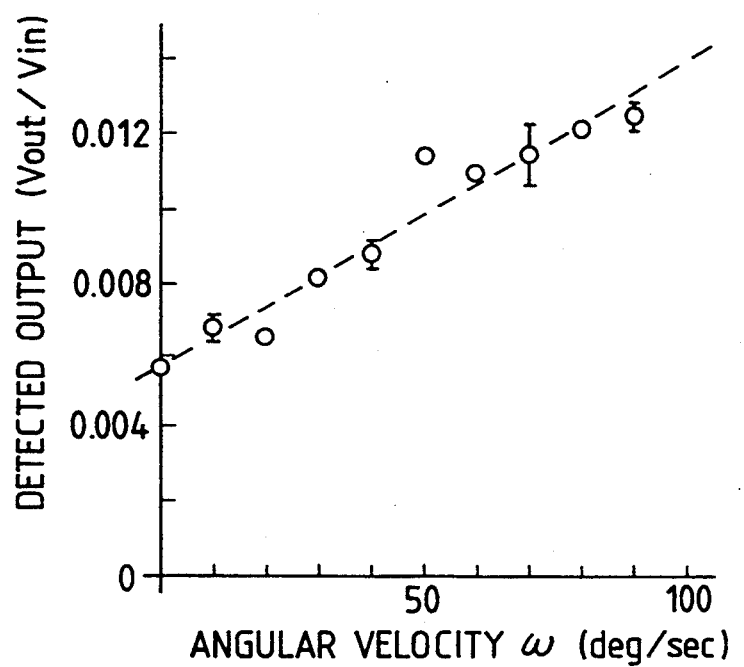
FIG. 15 is a detection characteristic chart of the vibratory gyroscope shown in FIG. 13.
Figure 16:
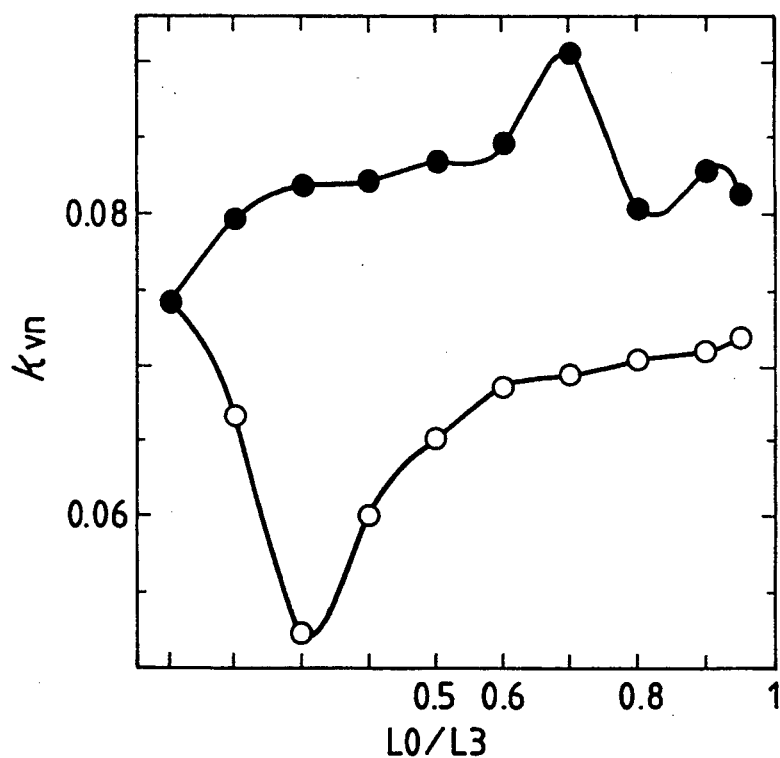
FIG. 16 is a chart showing the characteristics of an electromechanical coupling coefficient of specimen I shown in Table 1.
Figure 17:
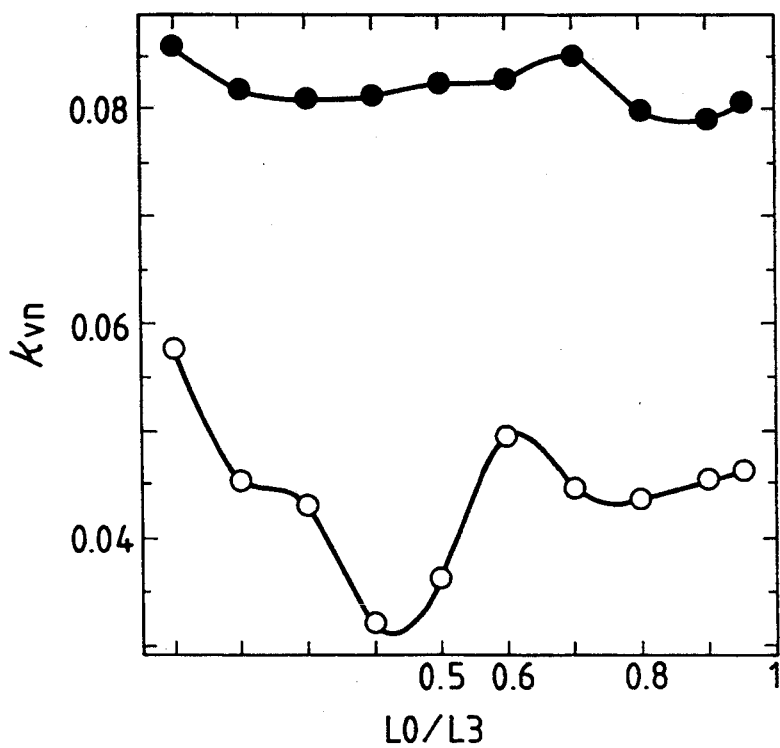
FIG. 17 is a chart showing the characteristics of an electromechanical coupling coefficient of specimen II shown in Table 1.
Figure 18:
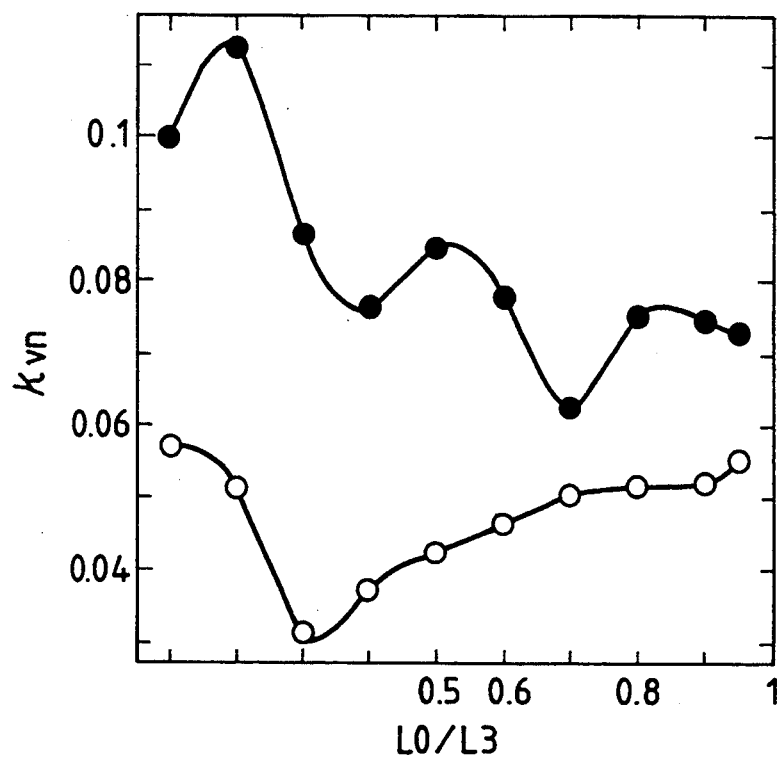
FIG. 18 is a chart showing the characteristics of an electromechanical coupling coefficient of specimen III shown in Table 1.
Figure 19:
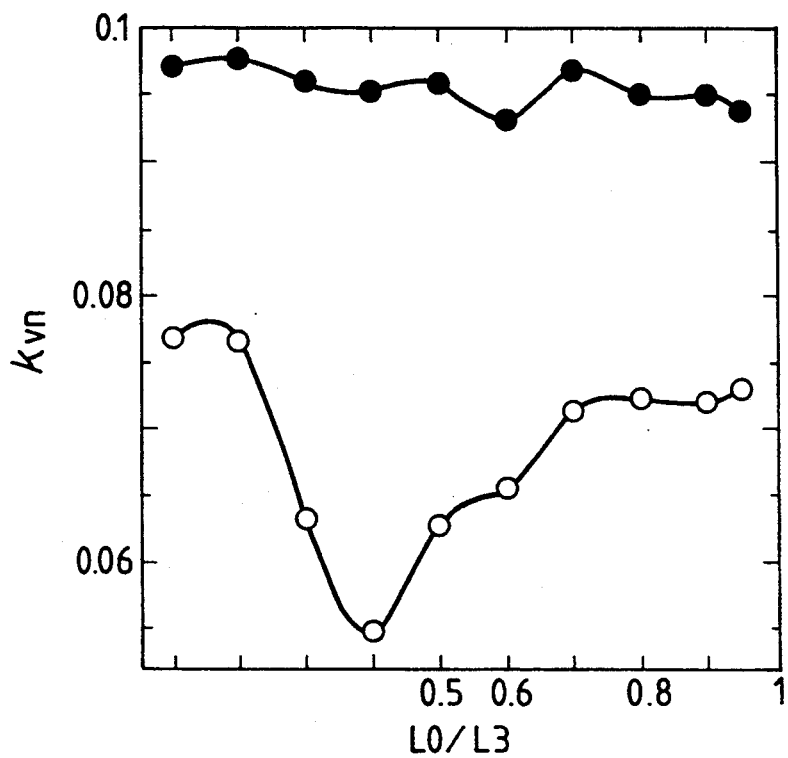
FIG. 19 is a chart showing the characteristics of an electromechanical coupling coefficient of specimen IV shown in Table 1.

FIG. 13 and FIG. 14 illustrate another structure of the vibrator in the first embodiment discussed above. FIG. 13(A) is the plan view of the vibrator, FIG. 13(B) is the side view of the vibrator, and FIG. 14 is the end surface view of the vibrator.

The vibrator 10 is made of a plate-shaped constantly elastic alloy (elinvar) having a thickness of t0, and it has elastic arms 10a, 10b, and 10c, which are separated by the slits 11, 11 and which all have the same width D. The depth of the slit 11 is denoted by L3. In the base 10d with no slit 11 formed, the length of the portion, which is not supported by the rigid bodies 12a, 12b, in the same direction as that of L3 is indicated by L0.

The vibration of this vibrator 10 is in mode A as in the embodiment of FIG. 10. As shown in FIG. 14, the elastic arms 10a, 10b, and 10c are provided with piezoelectric elements 26, 27, and 28, respectively, as the driving means, and the elastic arms 10a, 10b, and 10c are provided with piezoelectric elements 21, 22, and 23, respectively, as the detecting means. The directions of polarization (+) (−) of the respective piezoelectric elements are indicated by arrowheads in FIG. 14.

The elastic arms of the vibrator 10 are driven by the aforesaid piezoelectric elements 26, 27, and 28 in the x direction shown in FIG. 2 and vibrated in the first resonance. When the vibrator 10 turns around the center line 0 as shown in FIG. 2, Coriolis force causes the elastic arms 10a, 10b, and 10c to develop the vibration of the second resonance in the y direction due to mode A. The vibration is detected through the piezoelectric elements 21, 22, and 23, which serve as the detecting means, to provide a detection output.

In FIG. 13, the thickness of each piezoelectric element is denoted by t1, and the length and width of the piezoelectric element are denoted by Ls and d, respectively.

Table 1 below gives specific combinations of the foregoing dimensions D, L3, and t0 of the vibrator 10 and the dimensions Ls, d, and t1 of the piezoelectric elements. I through IV denote the specimen numbers of the vibrators having the dimensions shown.

TABLE 1

| Dimension | I (FIG. 16) | II (FIG. 17) | III (FIG. 18) | IV (FIG. 19) |
|---|---|---|---|---|
| D | 40 mm | 70 mm | 70 mm | 40 mm |
| L3 | 200 mm | 200 mm | 200 mm | 200 mm |
| t0 | 0.6 mm | 0.6 mm | 0.6 mm | 0.6 mm |
| Ls | 200 mm | 200 mm | 200 mm | 200 mm |
| d | 17 mm | 32 mm | 10 mm | 10 mm |
| t1 | 0.5 mm | 0.25 mm | 0.5 mm | 0.5 mm |

FIG. 15 shows the detection accuracy of the angular velocity $\omega$, the accuracy being obtained when the length L0 of the portion of the base 10d, which is not supported by the rigid bodies, is set to 180 mm in the vibrator of specimen number III with the dimensions thereof shown in Table 1 above.

An AC voltage having a 5 V peak-to-peak value is applied to the driving piezoelectric elements 26, 27, and 28 at a driving frequency of 8116 Hz, thereby driving the elastic arms 10a, 10b, and 10c in the x direction and vibrating them in the first resonance. Providing all the elastic arms 10a, 10b, and 10c with the same width D brings the frequency value of the first resonance vibration in the x direction close to the frequency value of the second resonance vibration in the y direction in the resonance of mode A. The driving frequency 8116 Hz is the frequency lying midway between the first resonant frequency of the elastic arms 10a, 10b, and 10c in the x direction and the second resonant frequency in the y direction.

The vibrator 10 was rotated around the center line O while changing the angular velocity $\omega$ on an x-y plane to cause the elastic arms to vibrate in the y direction in the second resonance, and the outputs obtained through the detecting piezoelectric elements 21, 22, and 23 were measured. FIG. 15 shows the angular velocity $\omega$ (deg/sec) on the axis of abscissa and the detected outputs ($V_{out}/V_{in}$) from the piezoelectric elements on the axis of ordinate. The output $V_{out}$ is indicated in an effective value. The vibrator of the specimen number III was rotated and the detected output at each specific angular velocity was measured five times, the mean values obtained being shown in the chart of FIG. 15. As shown in FIG. 15, the detected outputs linearly change in proportion to the angular velocity. Accordingly, it is understood that the angular velocity can be proportionally calculated from detected outputs.

Investigation was carried out on the influences exerted by the ratio of the length L0 of the portion of the base 10d, which is not supported by the rigid bodies, to the depth L3 of the slit 11 on the electromechanical coupling coefficient of the vibrator in the vibrator having the structure shown in FIG. 13 and FIG. 14.

FIG. 16 through FIG. 19 indicate the electromechanical coupling coefficients obtained when the L0/L3 ratio was changed from 0.1 to 1.0 in the specimens I, II, III, and IV having the dimensions shown in Table 1. In each chart, the line connecting white dots indicates the electromechanical coupling coefficient ($k_{vn}$) in the first resonant vibration of the elastic arms in the x direction, while the line connecting black dots indicates the electromechanical coupling coefficient ($k_{yn}$) in the second resonant vibration of the elastic arms in the y direction.

In the charts, it is seen that the efficient of the conversion between the electrical system and the mechanical system is lower in the first resonant vibration in the x direction indicated by the white dots than in the second resonant vibration in the y direction, and further, the L0/L3 ratio significantly influences the efficiency of the conversion between the electrical system and the mechanical system in the first resonant vibration in the x direction. In the specimens I through IV, to obtain the electromechanical coupling coefficient values, which are stable to a certain extent, in the first resonant vibration in the x direction, the L0/L3 ratio should preferably be 0.6 or more. Further preferably, the L0/L3 ratio should be 0.8 or more. In other words, when the dimension L0 of the portion of the base 10d, which is not supported by the rigid bodies, is longer than the depth L3 of the slit 11 (the lengths of the elastic arms 10a, 10b, and 10c), better efficiency of the conversion between the electrical system and the mechanical system in the first resonance in the x direction results, allowing the sharpness (Q value) of resonance to be improved and stabilized as well. Moreover, in FIG. 16 through FIG. 19, as L0/L3 approaches 1, the electromechanical coupling coefficient further increases, but if it exceeds 1, then the vibration balance of the whole vibrator may be disturbed. For this reason, L0/L3 should be 0.6 or more, a preferable range thereof being 0.6 to 1.0, and a further preferable range being 0.8 to 1.0.

In the embodiment shown in FIG. 10 and the embodiment shown in FIG. 13, the first resonant vibration in the x direction, which takes place in the elastic arms due to Coriolis force generated when the elastic arms are driven in the second resonant vibration in the y direction by the piezoelectric elements to rotate the vibrator, can be detected through the piezoelectric elements, making it possible to detect the angular velocity from the output.

The second embodiment shown in FIG. 21 and FIG. 22 is a vibratory gyroscope, which is configured so that the vibration mode of the vibrator 10 becomes mode B shown in FIG. 4.

As shown in FIG. 22, only the right and left elastic arms 10b and 10c vibrate in mode B; therefore, a pair of piezoelectric elements 36 and 37 as the driving means is attached to the front and back, respectively, of the two elastic arms 10b and 10c. Additionally, the elastic arms 10b and 10c are provided with a pair of piezoelectric elements 31 and 32 as the detecting means on the front and back thereof.

The direction of polarization of each piezoelectric element is indicated by (+) for the right direction and by (−) for the left direction in FIG. 22(B). The electrodes of the piezoelectric elements on one side are grounded in close contact with the surfaces of the elastic arms 10b and 10c. As in FIG. 12, AC power is applied to the surfaces of the driving piezoelectric elements 36 and 37. Detected outputs can be taken out through the electrodes on the front surfaces of the detecting piezoelectric elements 31 and 32.

As shown in FIG. 4, in mode B, the elastic arms 10b and 10c are driven by the driving piezoelectric elements 36 and 37 so that the amplitudes of the elastic arms are in the +x direction and −x direction, respectively, at a given point. The resulting surface deformation due to the distorted vibration of the two elastic arms 10b and 10c in the y direction is converted into a voltage through the detecting piezoelectric elements 31 and 32. Calculating the sum of the AC powers enables the detection of the angular velocity $\omega$.

When using the vibrator of mode B, a structure, wherein the center of the proximal end of the base 10d is supported by the support bar 13 as shown in FIG. 21, is commonly used. Stable mechanical support is achieved by supporting the center of the proximal end of the base 10d and the central point of the distal end of the elastic arm 10a by the support bars 13 and 14, respectively. In the case of the support structure shown in FIG. 21, the resonance frequency can be stabilized and a high Q value can be achieved by setting the length La of the support bar 13 to 15 mm or more and the diameter Da to 0.5 mm or less. Likewise, in the case of the structure shown in FIG. 24, wherein both ends are supported, a stable resonance frequency add a high Q value can be achieved by selecting optimum lengths and diameters of the support bars 13 and 14.

Even in mode B, the amplitude of the proximal end of the base 10d can be reduced to nearly zero as long as the depth L3 of the slit 11 is ⅓ or less of the full length L; therefore, by so setting the dimension of the slit 11, the structure, wherein the base 10d is supported by the rigid bodies 12a and 12b, is available as in the one shown in FIG. 10.

In mode B, since the resonance frequency can be changed by changing the dimension L2 of the base 10d as shown in FIG. 7, the resonance frequency can be easily adjusted by trimming the distal end of the base 10d or by changing the depth of the slits 11, 11.

In this embodiment also, the vibration in the ±x direction, which is generated by Coriolis force when the elastic arms 10b and 10c are driven and vibrated in the ±y directions in phases opposite from each other and the vibrator 10 is rotated, may be detected and the angular velocity $\omega$ may be determined from the detected output.

FIG. 25 through FIG. 27 illustrate a vibrator 40 of a vibratory gyroscope of the fourth embodiment according to the present invention.

In this embodiment, the whole vibrator 40 is made of a piezoelectric material. The slits 41, 41 are cut in from the distal end to form three elastic arms 40a, 40b, and 40c. The directions of polarization of the elastic arms 40a, 40b, and 40c are as shown by white arrowheads in FIG. 26.

In this vibrator 40, the elastic arms 40b and 40c on both sides are exclusively used for driving, the middle elastic arm 40a being exclusively used for detection.

As shown in FIG. 26, driving electrodes 51a, 51b through 54a, 54b are provided, being laminated on the front surfaces of the driving arms 40b, 40c. Of the driving electrodes, 51a, 52b, 53a, and 54b are grounded, while AC power is applied to 51b, 52a, 53b, and 54a. As a result, as shown in FIG. 27, the elastic arms 40b and 40c vibrate in the same amplitude direction as shown by, for example, −x at a certain point. Turning the vibrator around the axis O causes Coriolis force to work on the elastic arms 40b and 40c, and the elastic arms 40b and 40c deform and vibrate in the same direction, the −y direction, for example.

When the two elastic arms 40b and 40c vibrate in the x direction in the same phase, the middle elastic arm 40a vibrates in a phase opposite from that of the two elastic arms 40b, 40c due to reaction force. For instance, if the amplitude direction of the elastic arms 40b and 40c at a certain point is −x, then the amplitude direction of the middle elastic arm 40a is +x. In other words, the middle elastic arm 40a deforms and vibrates in the opposite direction from that of the elastic arms 40b and 40c, which are driven in the x direction, to provide dynamic balance. At this time, the middle elastic arm 40a vibrates in the +y direction due to Coriolis force.

Hence, as shown in FIG. 26, detecting electrodes 61a through 63b are provided on the front surface of the middle elastic arm 40a. Of the detecting electrodes, 61b, 62a, and 63b are grounded, AC power being detected between 61a, 62b, 63a and the ground.

The vibration in the y direction in the fourth embodiment is the same mode A as shown in the embodiment mainly of FIG. 10. Accordingly, the proximal end of the vibrator 40 can be held between the rigid bodies for supporting it, and also the resonance frequency can be changed by changing the length of the middle elastic arm 40a, thus enabling the effects of mode A to be acquired. The preferable range of the ratio of the dimension L0 of the portion of the base 10d, which is not supported by the rigid bodies, to the depth L3 of the slits (the length of the elastic arms) shown in FIG. 13 is also the same as that explained in the embodiment of FIG. 13.

When driving the elastic arms 40b, 40c on both sides in the embodiment shown in FIG. 25, the elastic arms may be driven and vibrated in the y direction, causing the middle elastic arm 40a to be vibrated in the opposite direction due to the reaction force, thus detecting the vibration in the x direction generated by Coriolis force through the detecting electrodes.

In all the embodiments described above, three elastic arms 10a, 10b, and 10c, or 40a, 40b, and 40c are driven so that two or three of them resonate and vibrate in the x or y direction, then the resonant vibration of the respective elastic arms in the y or x direction caused by Coriolis force is detected to determine the angular velocity ω. As an alternative, only one of the three elastic arms 10a, 10b, and 10c, or 40a, 40b, and 40c may be driven. For instance, only the middle elastic arm 10a or 40a may be driven so that it resonates and vibrates in the x direction or y direction and the vibration of the middle elastic arm 10a or 40a in the y or x direction caused by Coriolis force during the rotation may be detected to determine the angular velocity ω. In this case also, the resonance frequency can be adjusted merely by trimming the elastic arm 10a or 40a, which is the plate material, thus assuring easy adjustment work.

As another alternative, the vibration may be detected from only one of the three or two elastic arms, which resonate and vibrate due to Coriolis force to determine the angular velocity ω in the embodiment of FIG. 10 and FIG. 11, the embodiment of FIG. 13, and the embodiment of FIG. 21 and FIG. 22.

Additionally, in each embodiment described above, the vibrator has a thin plate shape so that, when the vibration in the x direction is the first resonance, the vibration in the y direction becomes the second resonance, however, the vibrator may alternatively be, for example, a plate material having a certain thickness as shown in FIG. 26. Or it may be a trident-type tuning fork vibrator, the elastic arms thereof having square cross sections.

Further alternatively, as shown in FIG. 20, plate conventional tuning forks 10A and 10B may be rigidly connected with a rigid spacer 10D, the two central plate pieces constituting the elastic arm 10a and the plate pieces on both sides constituting the elastic arms 10b and 10c. The simplified trident-type tuning fork vibrator can be used in place of the vibrator in each embodiment described above, and it can be operated from the vibration of mode A and of mode B.

Hence, according to the present invention, the vibrator is provided with three elastic arms, however, it is not always necessary to trim all elastic arms to adjust the resonance frequency; instead, merely changing the length of the middle elastic arm is enough to serve the purpose, or the frequency can be easily adjusted by changing the length of the base with no slit formed. Moreover, there is practically no fear of the adjustment causing asymmetrical vibration of the vibrator.

The use of the plate shape for the vibrator improves the yield of the material, permitting mass production at lower cost. It is also possible to form the vibrator by using a piezoelectric material. The structure, wherein the elastic arms on both sides vibrate in an opposite phase from that of the middle elastic arm, allows the base of the vibrator to be supported by rigid bodies, making it possible to produce a vibratory-gyroscope with stable support.

Furthermore, higher efficiency of the conversion between the electrical system and the mechanical system and higher or stable quality factor can be accomplished by setting the ratio of the length of the portion, which has no slit formed and which is not rigidly supported, to the depth of the slits or the length of the elastic arms, to the preferable ranges mentioned above.

We claim:

1. A vibratory gyroscope comprising:
    a vibrator including first, second and third parallel elastic arms;
    driving means for generating vibration in at least one of said elastic arms in a first direction; and
    detecting means for detecting a vibration component in said at least one of said elastic arms in a second direction when the vibrator rotates, the second direction being orthogonal to the first direction;
    wherein the vibrator is a plate defining an x-z plane, the plate including a base portion and said first, second and third elastic arms extending from the base portion in an x-direction, the first and second elastic arms being separated by a first slit formed penetrating in a y direction, and the second and third elastic arms being separated by a second slit; and
    wherein a thickness of the plate defines a y direction.

2. A vibratory gyroscope comprising:
    a vibrator including first, second and third parallel elastic arms;
    driving means for generating vibration in at least one of said elastic arms in a first direction; and
    detecting means for detecting a vibration component in said at least one of said elastic arms in a second direction when the vibrator rotates, the second direction being orthogonal to the first direction;
    wherein the vibrator comprises a constantly elastic alloy and piezoelectric elements are attached to the constantly elastic alloy as said driving means and said detecting means;
    wherein the vibrator is a plate defining an x-z plane, the plate including a base portion and said first, second and third elastic arms extending from the base portion in an x-direction, the first and second elastic arms being separated by a first slit formed penetrating in a y direction, and the second and third elastic arms being separated by a second slit; and wherein a thickness of the plate is the y direction and a direction along the upper surface is the x direction.

3. A vibratory gyroscope comprising:

a vibrator made of a piezoelectric material, the vibrator including first, second and third parallel elastic arms;

a driving electrode for generating vibration in at least one elastic arm in a first direction; and a detecting electrode for detecting a vibration component in said at least one of said elastic arms in a second direction when the vibrator rotates, the second direction being orthogonal to the first direction;

wherein the vibrator is a plate defining an x-z plane, the plate including a base portion and said first, second and third elastic arms extending from the base portion in an x-direction, the first and second elastic arms being separated by a first slit formed penetrating in a y direction, and the second and third elastic arms being separated by a second slit; and wherein a thickness of the plate defines a y direction.

4. The vibratory gyroscope according to claim 3, wherein the vibrator is supported by a rigid body connected to the base portion on extended lines of the slits when, of the first, second and third elastic arms, the first and third elastic arms, which are located on opposite sides of the second elastic arm, deform and vibrate in a common direction and in an opposite direction from the second elastic arm.

5. The vibratory gyroscope according to claim 3, wherein the base portion is supported by a rigid body, a length of the first and second slits in the x-direction is L3, a length of the base portion in the x-direction from the rigid body to the first and second slits is L0, and L0/L3 is 0.6 or more.

6. The vibratory gyroscope according to claim 3, wherein the base portion is supported by a rigid body, a length of the first and second slits in the x-direction is L3, a length of the base portion in the x-direction from the rigid body to the first and second slits is L0, and L0/L3 is 0.8 or more and 1.0 or less.

7. The vibratory gyroscope according to claim 3, wherein the vibration of the elastic arms in the y direction is higher-order resonant vibration than the vibration in the x direction.

8. The vibratory gyroscope according to claim 7, wherein the vibrator is supported by a rigid body connected to the base portion on extended lines of the slits when, of the first, second and third elastic arms, the first and third elastic arms, which are located on opposite sides of the second elastic arm, deform and vibrate in a common direction and in an opposite direction from the second elastic arm.

9. The vibratory gyroscope according to claim 7, wherein the base portion is supported by a rigid body, a length of the first and second slits in the x-direction is L3, a length of the base portion in the x-direction from the rigid body to the first and second slits is L0, and L0/L3 is 0.6 or more.

10. The vibratory gyroscope according to claim 7, wherein the base portion is supported by a rigid body, a length of the first and second slits in the x-direction is L3, a length of the base portion in the x-direction from the rigid body to the first and second slits is L0, and L0/L3 is 0.8 or more and 1.0 or less.

* * * * *

UNITED STATES PATENT AND TRADEMARK OFFICE
CERTIFICATE OF CORRECTION

PATENT NO.    :   5,451,828
DATED         :   September 19, 1995
INVENTOR(S)   :   Yoshiro Tomikawa and Kazumasa Ohnishi It is certified that error appears in the above-identified patent and that said Letters Patent is hereby corrected as shown below:
ON THE TITLE PAGE:
Please add third inventor Akira Satoh Signed and Sealed this Sixteenth Day of January, 1996

*Attest:*

BRUCE LEHMAN

*Attesting Officer*    Commissioner of Patents and Trademarks